Oct. 10, 1967

G. F. JOHNSTON ET AL 3,346,061

WEIGHT RECORDING SYSTEM

Filed May 10, 1965

INVENTORS
GEORGE F. JOHNSTON
GORDON E. DUNCAN

BY *Norris & Bateman*

ATTORNEYS

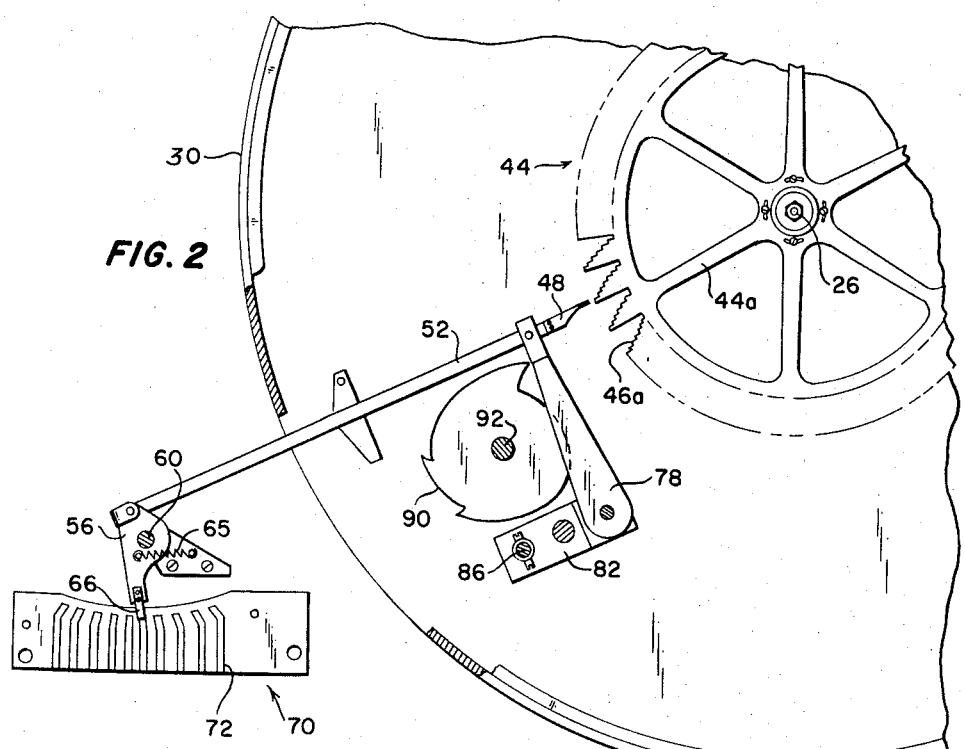
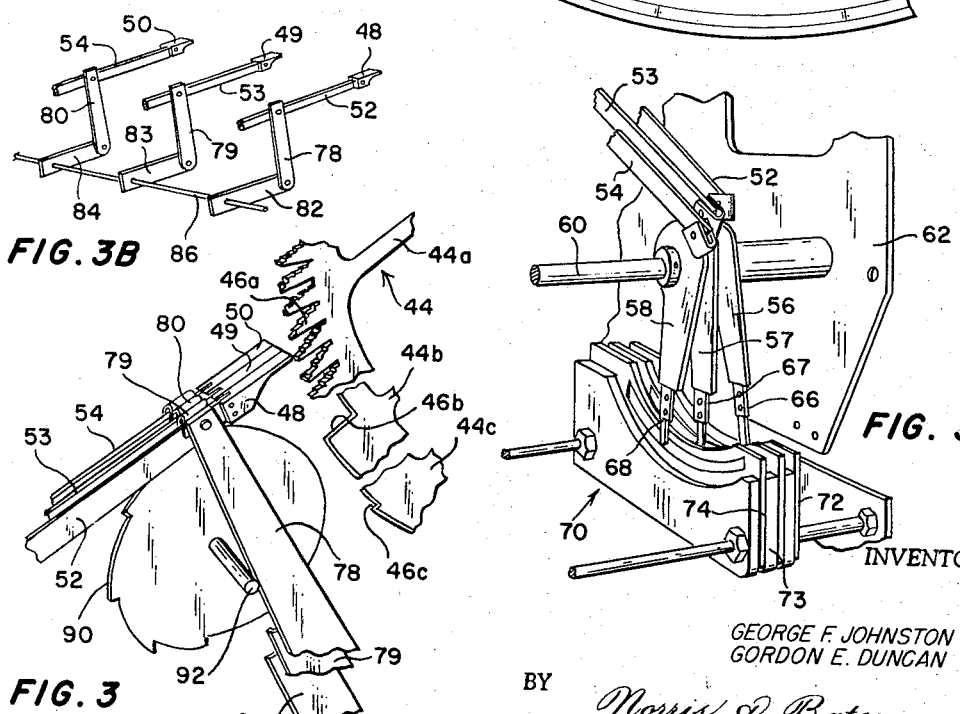

Oct. 10, 1967

G. F. JOHNSTON ET AL 3,346,061

WEIGHT RECORDING SYSTEM

Filed May 10, 1965

INVENTOR
GEORGE F. JOHNSTON
GORDON E. DUNCAN

BY Norris & Bateman
ATTORNEYS

United States Patent Office 3,346,061
Patented Oct. 10, 1967

3,346,061
WEIGHT RECORDING SYSTEM
George F. Johnston, Wayne, N.J., and Gordon Eugene Duncan, Southgate, Calif., assignors to Howe Richardson Scale Company, Clifton, N.J., a corporation of Delaware
Filed May 10, 1965, Ser. No. 454,358
5 Claims. (Cl. 177—2)

ABSTRACT OF THE DISCLOSURE

The remotely controlled weight recording system disclosed herein has an electrical memory storage network composed of bi-stable storage devices representing a series of digits in each of a plurality of orders of a multi-digit number, an analog-to-digital converter which responds to a load applied to the scale to actuate preselected ones of the bi-stable devices in each order to retain the weight of the load, and a control circuit responding to the actuation of the bi-stable devices for indexing printing type carriers to positions for printing out the weight of the load on the scale.

---

The present invention relates to weighing systems and is particularly concerned with a novel weighing system having a remotely controlled printer for recording the weight of a load placed on a weighing scale.

In conventional weight recording systems, a printer is customarily mounted on the dial head of the weighing machine, and the print wheels are indexed by an analog-to-digital converter which is operatively connected to the dial indicator shaft of the scale. Among the numerous disadvantages of this type of weight recording system, the print cannot be made larger than the standard 5/32 inch size without objectionably modifying the construction of the weighing machine. In addition, conventional weighing systems having a printed read-out are disadvantageous from the standpoint that the load must be retained on the scale during the printing operation. This prevents the operator from removing the load or placing a new one on the scale before he actuates the printer to print out the weight.

Accordingly, it is a primary object of this invention to provide a weight recording system wherein a remotely controlled printing device is structurally independent of a weighing scale to enable the print size in the printer to be made larger than the 5/32 inch standard size without modifying the components of the scale. According to this aspect of the present invention, a conventional weighing scale can be employed and the print size may be made as large as needed to provide a readily legible print for a given application. As a result, this invention is particularly useful in industries requiring an exceptionally large print size such as 1 inch for example.

Another important object of this invention is to provide a novel, remotely controlled printing device for a weighing machine wherein the printing device contains an electrical memory storage circuit that permits a weighed load to be removed from the weighing scale before or during the printing operation. In addition, the printing device of this invention allows a new load to be placed on the scale before the weight of a preceding load is printed out. As a result, a savings in time in weighing and printing out the weights of successive loads can be achieved in comparison with conventional systems since the operator can print out the weight of a preceding load during the interval when the next load is being moved onto the scale and the balance member of the scale is moving to its static balancing position.

Another object of this invention is to provide a novel, remotely controlled printer for a weighing scale wherein the printer contains a memory storage circuit, a print wheel motor drive actuated by output signals from the memory storage circuit, and an electrical interlock that prevents the actuation of the print wheel motor drive until the weight of a load is digitally entered into the storage circuit.

A further more specific object of this invention is to provide a novel, remotely controlled printer for a weighing scale wherein the printer contains a relatively simplified network of bi-stable storage devices representing a series of digits in each of a plurality of orders of a multi-digit number, an analog-to-digital converter which responds to a load applied to the scale to actuate preselected ones of the bi-stable devices in each order to retain the weight of the load, and a control circuit responding to the actuation of the bi-stable devices for indexing printing type carriers to position for printing out the weight of the load.

Further objects of this invention will appear as the description proceeds in connection with the appended claims and the annexed drawings wherein:

FIGURE 2 is an enlarged, fragmentary rear elevation of the scale dial head illustrated in FIGURE 1 with part of the dial head casing broken away to show interior details of the digitizing mechanism for converting the rotary movement of the dial indicator shaft into digital information;

FIGURES 3 and 3A are enlarged, fragmentary, perspective views of the digitizing mechanism illustrated in FIGURE 2 with FIGURE 3A illustrating a continuation of the structure shown in FIGURE 3;

FIGURE 3B is a partially schematic perspective view of a fragmentary portion of the digitizing mechanism shown in FIGURE 2 and FIGURE 3;

Figure 1:
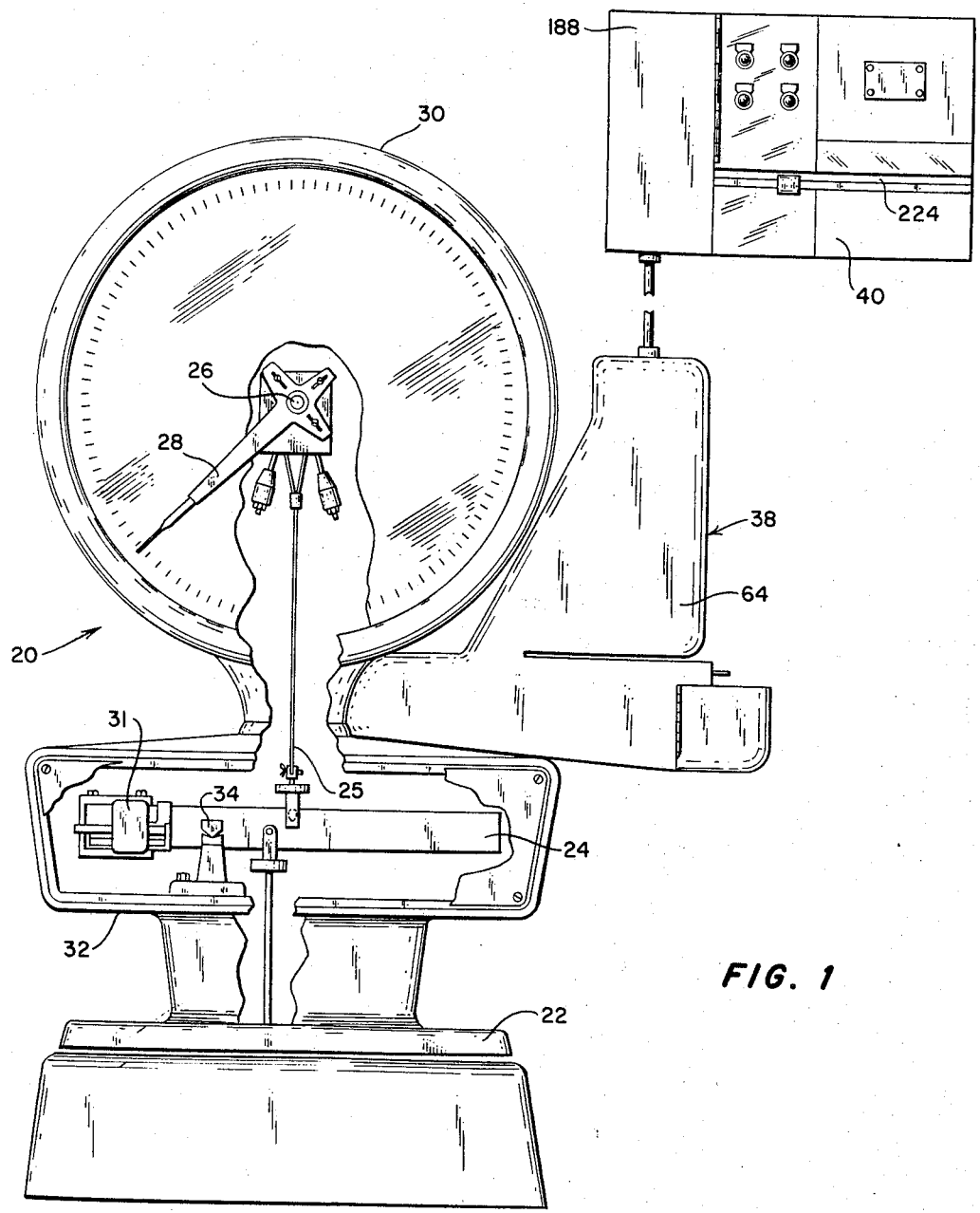
FIGURE 1 is a partially schematic, elevation of a weighing system incorporating a printer constructed according to the principles of the present invention.
Figure 4:
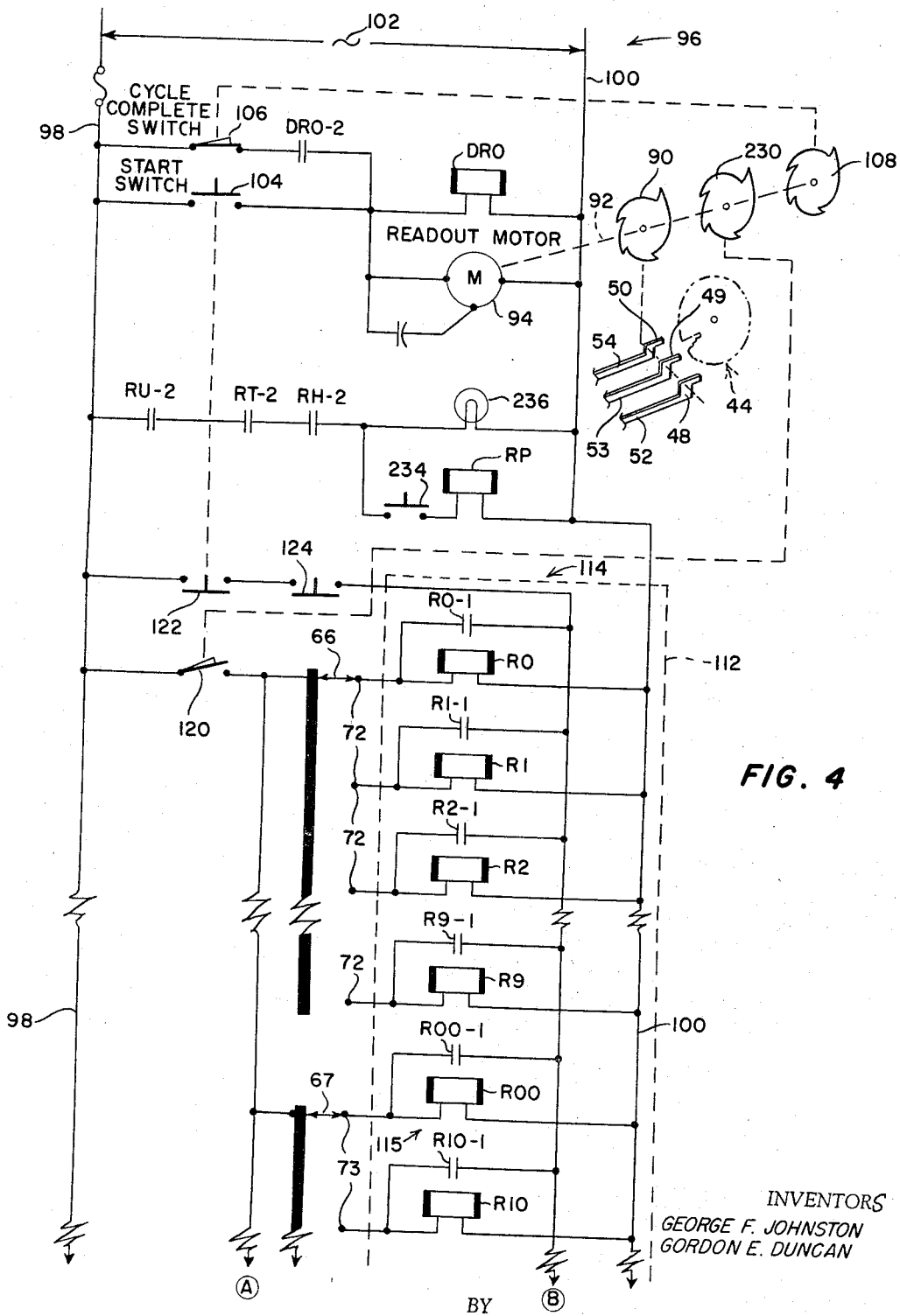
Figure 5:
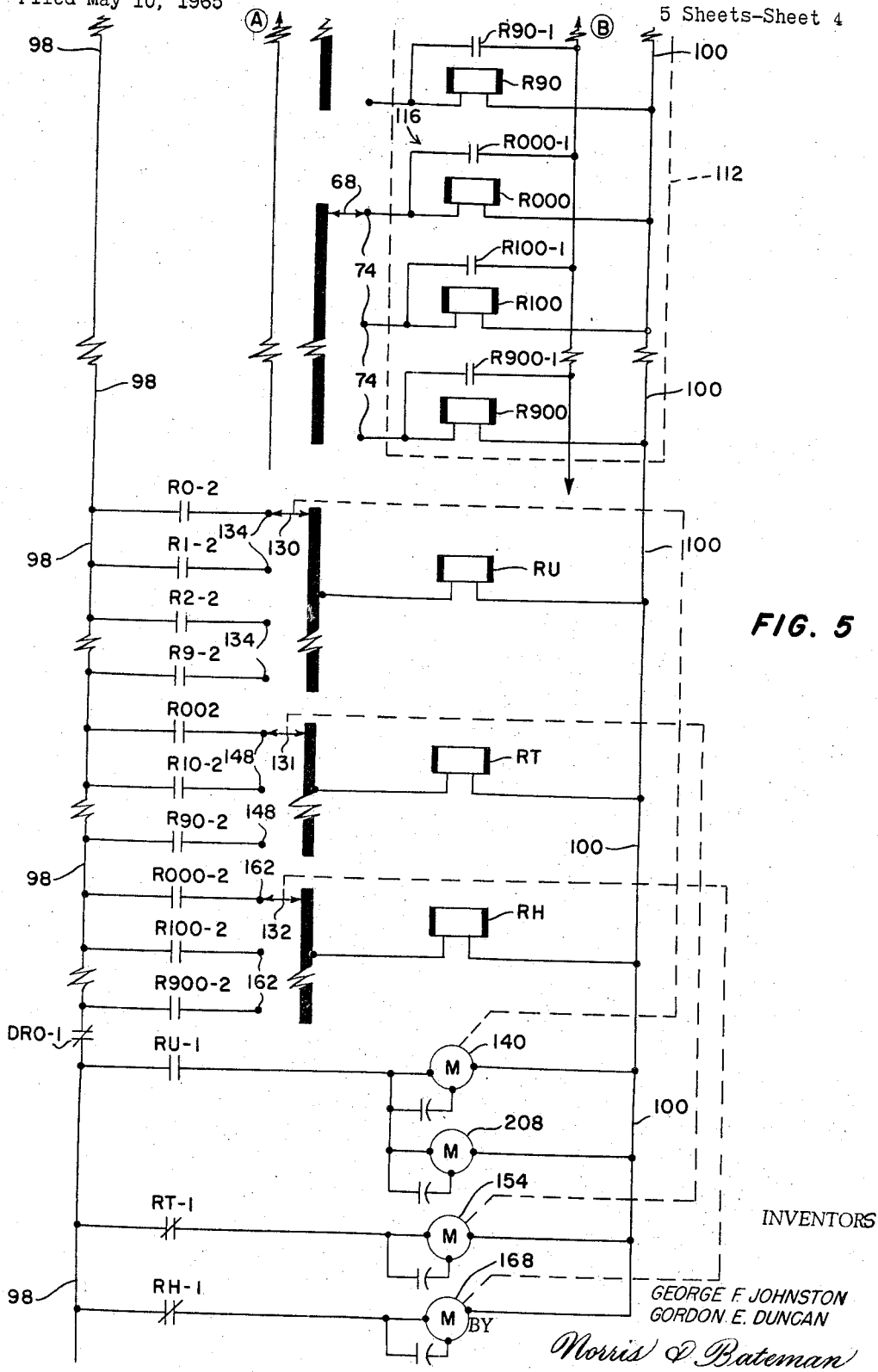
Figure 6:
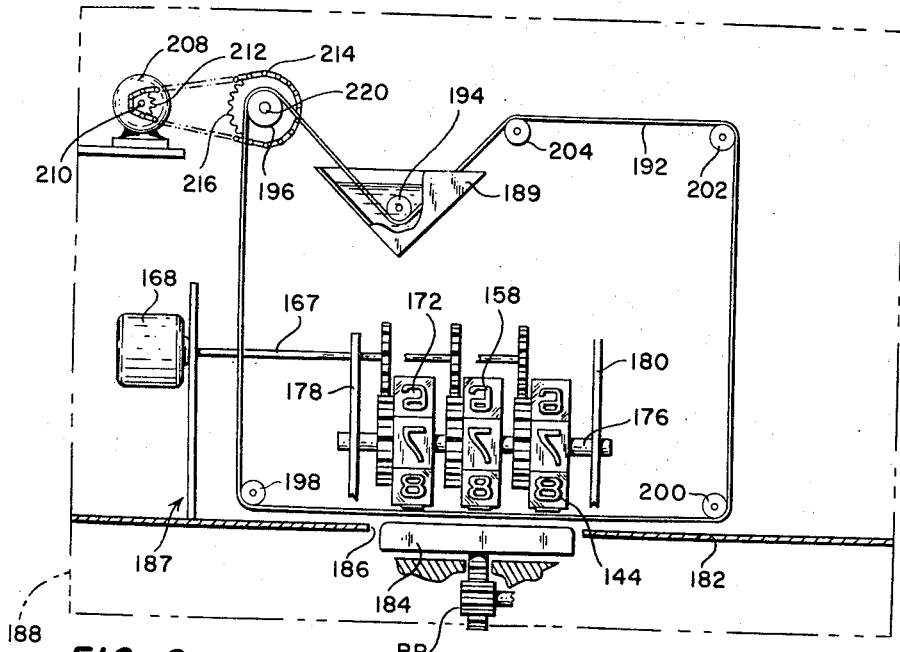
Figure 7:
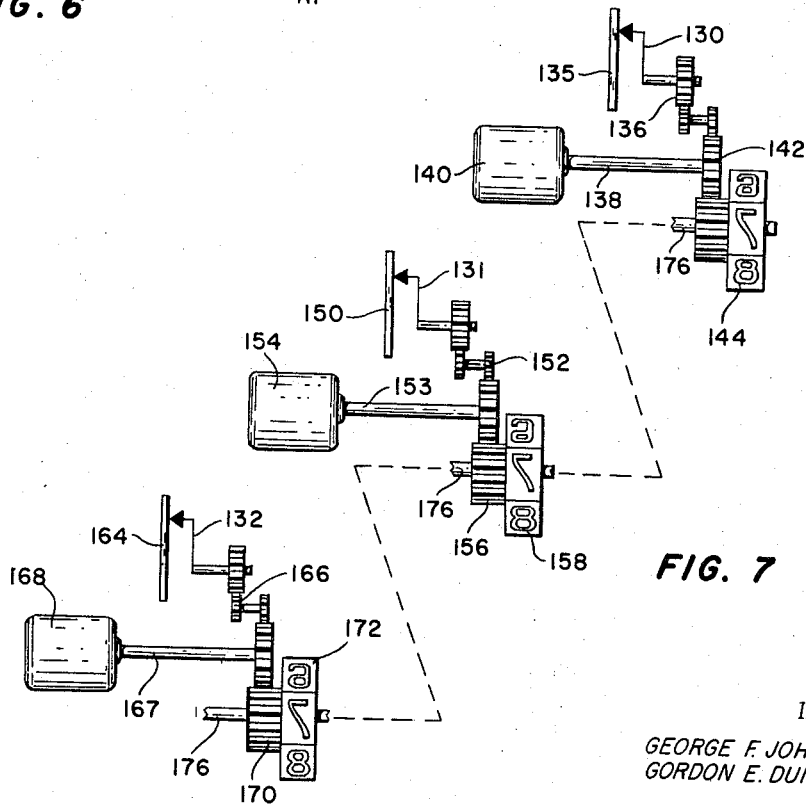

FIGURES 4 and 5 diagrammatically illustrate an electrical control circuit for the printer shown in FIGURE 1 with FIGURE 5 being arranged beneath FIGURE 4 to complete the circuit diagram;

FIGURE 6 is a partially schematic, enlarged elevation of the printer shown in FIGURE 1 with the printer casing removed; and FIGURE 7 is a fragmentary schematic view of the print wheels and the motor drives therefor.

Referring now to the drawings and more particularly to FIGURE 1, the reference numeral 20 generally designates a weighing scale which may be of any suitable, conventional form and which essentially comprises a platform 22 supported from a fulcrumed balance beam 24. Beam 24 is connected by a suitable motion transmitting linkage 25 to a rotatable mounted indicator shaft 26 which carries a dial pointer 28 in a dial head 30 for indicating the weight of a load placed on platform 22. Beam 24 is provided with a counterweight 31 and is pivotally mounted on a rigid base structure 32 by any suitable means such as a knife edge and load bearing assembly 34.

With continued reference to FIGURE 1, a digital read-out device 38 comprising an analog-to-digital converter is operatively connected to shaft 26 to convert the dial weight indications of scale 20 into corresponding digital information. The output of read-out device 38 is connected to a remotely controlled printer 40 which is actuatable to print the weight of a load supported on platform 22 on a card, label, or other surface.

Read-out device 38 may be of any suitable conventional form and preferably is the model EP-SD-11 manufactured by the Howe division of the Howe-Richardson Company. Another suitable device for converting the rotation of shaft 26 into digital information is described in United States Letters Patent No. 2,339,758 issued on Jan. 25, 1944, to L. C. Barnes for Recording Weighing Scale. While the readout device herein will be described to provide a number having three orders, namely units, tens, and hundreds, it will be appreciated that as many decades may be added as required.

As shown in FIGURES 2 and 3, read-out device 38 essentially comprises a cam wheel assembly 44 having a series of cam wheels 44a, 44b and 44c fixed on shaft 26. Cam wheels 44a, 44b, and 44c respectively represent the units, tens, and hundreds decades of the multi-digit number to be read out by device 38. Wheels 44a, 44b and 44c are respectively provided at their peripheries with stepped cam surfaces indicated at 46a, 46b, and 46c. A series of three index fingers 48, 49, and 50 are respectively engageable with cam surfaces 46a, 46b, and 46c and are respectively fixed on bars 52, 53, and 54.

Bars 52–54, as best shown in FIGURE 3A, are respectively pivotally secured to brackets 56, 57, and 58 which are independently rotatably mounted on a shaft 60. Shaft 60 is fixedly supported on a rigid frame structure 62 which is enclosed by a suitable casing 64 (see FIGURE 1). Each of the brackets 56–58 is resiliently biased in a counterclockwise direction as viewed from FIGURE 2 by a spring 65 to urge fingers 48–50 to retracted positions where they are spaced radially from cam wheel assembly 44.

Fixed to brackets 56–58 respectively are wiper arms 66, 67, and 68 (see FIGURE 3A) which form a part of a digital read-out switch assembly 70. Assembly 70 is provided with three contact banks 72, 73, and 74 respectively representing the units, tens, and hundreds decades. Each of the banks 72–74 contain at least ten electrically insulated, fixed contacts for representing the digits 0 through 9 in each decade. Wipers 66–68 are individually swingable about the axis of shaft 60 to successively engage the contacts in banks 72–74 respectively.

After a load is placed on platform 22 and scale 20 comes into balances, fingers 48–50 are advanced toward cam wheel assembly 44 by means to be described shortly to respectively engage fingers 48–50 with cam surfaces 46a, 46b, and 46c. It will be appreciated that cam surfaces 46b provide ten vernier-like divisions of each of the cam surfaces 46c, and cam surfaces 46a provide ten similar divisions of each of the cam surfaces 46b. Depending upon the position to which cam wheel assembly 44 is rotated by rotation of shaft 26, therefore, fingers 48–50 are individually advanceable by predetermined distances until they abut the shoulders between adjacent lands on cam surfaces 46a, 46b, and 46c respectively. By displacing fingers 48–50, wipers 66–68 are also advanced proportional distances to positions in contact banks 72–74 corresponding to the digit in each decade of the multi-digit number representing the weight of a load indicated by pointer 28.

As shown in FIGURE 3B, a series of index lever arms 78, 79, and 80 are respectively pivotally connected to bars 52, 53, and 54 adjacent to fingers 48–50. Spaced from their pivot connections to bars 52–54, arms 78, 79, and 80 are respectively pivotally connected to levers 82, 83, and 84 which are independently rockably mounted on a shaft 86. Lever arms 78–80 support the forward ends of bars 52–54 and are rockable in opposite directions to radially advance and retract fingers 48–50 relative to cam wheel assembly 44.

To rock lever arms 78–80 back and forth for cyclically advancing and retracting fingers 48–50, a suitably contoured cam 90, as best shown in FIGURES 3 and 4, is mounted on a drive shaft 92 of a read-out motor 94. Rotation of cam 90 through one revolution advances and retracts fingers 48–50. Spring 65 normally biases fingers 48–50 to their illustrated retracted positions. The construction of read-out device 38 just described is conventional.

In accordance with the present invention, a circuit 96, as shown in FIGURE 4, controls energization of motor 94 and comprises a pair of electrical conductors 98 and 100 connected to opposite terminals of a suitable operating voltage source 102. Conductors 98 and 100 connect motor 94 across source 102 in series with a spring-loaded start pushbutton 104. To initiate a readout cycle pushbutton 104 is manually depressed to energize motor 94 and thereby rotate cam 90.

With continued reference to FIGURE 4, depression of pushbutton 104 also energizes a read-out relay DRO simultaneously with the energization of motor 94. Relay DRO has its winding connected in parallel with motor 94 and in series with pushbutton 104. Energization of relay DRO closes a set of normally open contacts DRO–2 to complete a holding circuit for relay DRO and motor 94 which may be traced from one terminal of source 102, through conductor 98, through a cycle complete switch 106, through contacts DRO–2 in parallel through the windings of motor 94 and relay DRO, and through conductor 100 to the other terminal of source 102. As will be explained in greater detail later on, switch 106 is normally closed at this stage of the operation and is momentarily opened by a cam 108 mounted on shaft 92 when one cycle of advancement and retraction of fingers 48–50 is completed.

Energization of motor 94 thus advances fingers 48–50 from their retracted positions shown in the drawings to engage cam surfaces 46a, 46b, and 46c with the result that wiper arms 66–68 are advanced to engage the contacts in banks 72–74 corresponding to the digits in the weight value indicated by pointer 28.

In accordance with this invention printer 40, as shown in FIGURES 4 and 5, is provided with a memory storage relay unit 112 comprising three relay banks 114, 115, and 116 respectively corresponding to the units decade, the tens decade, and the hundreds decade in a multi-digit number to be printed out by printer 40. Relay bank 114 is provided with ten relays R0, R1, and R2 through R9 of which only relays R0, R1, R2, and R9 are illustrated to simplify the drawings. Relays R0–R9 respectively correspond to the digits 0–9 in the units decade. The windings of relays R0–R9 have corresponding terminals connected to conductor 100. The other winding terminals of relays R0–R9 are connected to successive contacts in bank 72 as shown. Wiper arm 66 is connected through a read-out limit switch 120 to conductor 98.

From the foregoing circuitry it will be appreciated that when switch 120 is closed and wiper arm 66 engages the first contact in bank 70 as shown in FIGURE 4, a circuit is completed to energize relay R0. This circuit may be traced from one terminal of source 102 through conductor 98, through switch 120, through wiper 66 to the first contact in bank 70, through the winding of relay R0, and through conductor 100 to the other terminal of source 102. When wiper arm 66 is advanced to the second contact in bank 72, a circuit will similarly be completed for energizing relay R1 when switch 120 is closed. Likewise, energizing circuits are established for relays R2–R9 by advancing wiper arm 66 to successively engage the remaining contacts in bank 72.

For a purpose that will become apparent later on, relays R0, R1, and R2, R9 are respectively provided with normally open contacts R0–1, R1–1, and R2–1 through R9–1 to establish separate holding circuits for maintaining their respective relays energized when switch 120 is opened. Each of the holding circuits for relays R0, R1, and R2 through R9 may be traced from one terminal of source 102, through conductor 98, through a pair of series connected switches 122 and 124, through the normally open contacts of the respective relay, through the relay winding, and through conductor 100 to the other terminal of source 102.

With continued reference to FIGURES 4 and 5, bank 115 also is provided with ten relays R00 and R10 through R90 of which only relays R00, R10, and R90 are illustrated to simplify the drawings. Like the connections made for the relays in bank 114, corresponding winding terminals of relays R00 and R10 through R90 are connected to conductor 100. The other winding terminals of relays R00 and R10 through R90 are connected to successive contacts in bank 73 as shown. Wiper arm 67 is connected through switch 120 to conductor 98 and is in parallel circuit relationship with wiper arm 66.

Thus when a switch 120 is closed and wiper arm 67 is in engagement with the first contact in bank 73, a circuit is completed for energizing relay R00. When wiper arm 67 is moved to the next contact in bank 73 and switch 120 is closed, an energizing circuit is completed for relay R10. Thus, advancement of wiper arm 67 to successive contacts in bank 73 will respectively establish energizing circuits for relays R00 and R10 through R90 when switch 120 is closed. Relays R00 and R10 through R90 respectively represent the digits 0 and 1 through 9 in the tens decade of the multi-digit number to be printed out.

With continued reference to FIGURES 4 and 5, relays R00 and R10 through R90 are respectively provided with normally open contacts R00–1 and R10–1 through R90–1 which close when their respective relays are energized to complete holding circuits through switches 122 and 124 in parallel circuit relationship with the holding circuit established in relay bank 114.

Still referring to FIGURES 4 and 5, bank 116 also has ten relays R000 and R100 through R900 of which only relays R000, R100, and R900 are illustrated to simplify the drawings. Like the connections made for the relays in banks 114 and 115, corresponding winding terminals of relays R000 and R100 through R900 are connected to conductor 100. The other winding terminals of relays R000 and R100 through R900 are connected to successive contacts in bank 74. Wiper arm 68 is connected through switch 120 to conductor 98 and is in parallel circuit relationship with the units and tens relay energizing circuits through wiper arms 66 and 67 respectively. Relays R000 and R100 through R900 respectively represent the digits 0 and 1 through 9 in the hundreds decade of the multi-digit number to be printed out by printer 40.

Still referring to FIGURES 4 and 5, relays R000 and R100 through R900 are respectively provided with normally open contacts R000–1 and R100–1 through R900–1 which close when their respective relays are energized to complete separate holding circuits through switches 122 and 124. Switch 122 is ganged to pushbutton 104 so that it opens when pushbutton 104 is closed and closes when pushbutton 104 is opened. As a result, the holding circuit for the relays in banks 114–116 is interrupted to clear storage unit 112 whenever pushbutton 104 is depressed to initiate a new read-out operation. It will be appreciated that to print a multi-digit number having more than three decades, a corresponding number of relay banks are added to storage unit 112 in the manner just described for relay banks 114–116.

With the circuitry thus far described, engagement of wiper arms 66–68 respectively with the contacts in banks 72–74 results in the energization of one relay in each of the relay banks 114–116 when switch 120 is closed. Energization of the relays in bank 114–116 completes separate holding circuits traced through switches 122 and 124 as previously described to maintain the relay energizing circuits after switch 120 is opened. Thus, the digital information manifested by tap switch assembly 70 is retained in storage unit 112 after switch 120 is opened and is erased only by opening switch 122 or switch 124. Each relay together with its normally open holding contacts constitute a bi-stable device which is actuated by a signal and which latches in its actuated position.

To read out the digital information retained in storage unit 112, printer 40 is provided with a read-out network having three relays RU, RT, and RH respectively representing the units, tens and hundreds decades of the multi-digit number to be manifested by printer 40. As shown in FIGURE 5, the windings of relays RU, RT, and RH have corresponding terminals connected to conductor 100. The other winding terminals of relays RU, RT, and RH are respectively connected to contact wiper arms 130, 131, and 132.

With continuing reference to FIGURE 5, wiper arm 130 is advanceable to successively engage a series of ten contacts contained in a contact bank 134. The contacts in bank 134 are respectively connected in parallel circuit paths through normally open contacts R0–2, R1–2, and R2–2 through R9–2 which respectively close when relays R0, R1, and R2 through R9 are energized. Of the ten normally open contacts only contacts R0–2, R1–2, and R9–2 are shown to simplify the drawings. The contacts in bank 134 are arranged in an endless row on a switch contact plate 135 (FIGURE 7) so that wiper 130 in advancing in one direction will move from the last contact to the first contact in the bank.

As shown in FIGURES 6 and 7, wiper arm 130 is drive connected by a suitable gear train 136 to a drive shaft 138 of an electric motor 140. Conductors 98 and 100, as shown in FIGURE 5, connect motor 140 across source 102 in series with a set of normally closed contacts DR0–1 of relay DR0 and a set of normally closed contacts RU–1 of relay RU. Thus, when relays DR0 and RU are deenergized, a circuit is completed for energizing motor 140 to continuously advance wiper arm 130 in a predetermined direction.

With continued reference to FIGURES 6 and 7, motor 140 is drive connected by a suitable gear train 142 to rotate a unit print wheel 144 in printer 40. Gear trains 142 and 136 coordinate the rotation of print wheel 144 and the advancement of wiper arm 130. Thus, when motor 140 is energized, print wheel 144 is rotated simultaneously with the advancement of wiper arm 130. Motor 140 remains energized until it moves wiper arm 130 to a position where it coincides with the one of the sets of relay contacts R0–2, R1–2, and R2–2 through R9–2 that is closed. When this occurs, relay RU is energized to open contacts RU–1 and thereby interrupt the energizing circuit for motor 140 to stop print wheel 144 at the print point corresponding to the relay energized in bank 114.

With continued reference to FIGURE 5, wiper arm 131 also is advanceable to successively engage a series of ten contacts in a contact bank 148. The contacts in bank 148 are respectively connected in parallel circuit paths through normally open contacts R00–2 and R10–2 through R90–2 which close when relays R00 and R10 through R90 are respectively energized. Of the ten normally open contacts R00–2 and R10–2 through R90–2, only contacts R00–2, R10–2, and R90–2 are shown to simplify the drawings. The contacts in banks 148 are arranged in an endless row on a switch contact plate 150 (see FIGURE 7) so that wiper 131 in advancing in one direction will move from the last contact through the first contact in the bank.

As shown in FIGURE 7, wiper 131 is drive connected by a suitable gear train 152 to a drive shaft 153 of an electric motor 154. Conductors 98 and 100, as shown in FIGURE 5, connect motor 154 across source 102 in parallel with the energizing circuit for motor 140 and in series with contacts DR0–1 and contacts RT–1 of relay RT. Motor 154 is also connected by a suitable gear train 156 to rotate a hundreds print wheel 158 in printer 40. Gear train 152 and 156 coordinates the rotation of print wheel 158 and the advancement of wiper 131. Thus, when motor 154 is energized, print wheel 158 is rotated simultaneously with the advancement of wiper arm 131. Motor 154 like motor 140 remains energized until it moves wiper arm 131 to a position where it coincides with the one of the sets of contacts R00–2 and R10–2 through R90–2 that is closed. When this occurs, relay RT is energized to open contacts RT–1 and thereby interrupt the energizing circuit for motor 140 to stop print wheel 158 at its print point.

Similar to the circuitry just described for the units and tens decades, wiper arm 132 is advanceable to successively engage a series of ten contacts contained in a contact bank 162. The contacts in bank 162 are respectively connected in parallel circuit paths through normally open contacts R000–2 and R100–2 through R900–2 which close when relays R000 and R100 through R900 are respectively energized. Of the ten normally open contacts R000–2 and R100–2 through R900–2, only contacts R000–2, R100–2 and R900–2 are shown to simplify the drawings. The contacts in bank 162 are arranged in an endless row on a switch contact plate 164 (FIGURE 7) so that wiper 132 in advancing in one direction will move from the last contact to the first contact in the bank.

With continued reference to FIGURE 7, wiper arm 132 is drive connected by a suitable gear train 166 to a drive shaft 167 of an electric motor 168. Conductors 98 and 100, as shown in FIGURE 5, connect motor 168 across source 102 in series with contacts DR0–1 and a set of normally closed contacts RH–1 of relay RH. Thus, when relays DR0 and RH are deenergized, a circuit is completed for energizing motor 168 to continuously advance wiper 132.

Motor 158, as shown in FIGURE 7, is drive connected by a suitable gear train 170 to rotate a hundreds print wheel 172 in printer 40. Gear trains 166 and 170 coordinates the rotation of print wheel 172 and the advancement of wiper arm 132. Thus, when motor 168 is energized, print wheel 172 is rotated simultaneously with the advancement of wiper arm 132. Motor 168 remains energized until it moves wiper arm 132 to a position where it coincides with the one of the sets of relay contacts R000–2 and R100–2 through R900–2 that is closed. When this occurs, relay RH is energized to open contacts RH–1 and thereby interrupt the energizing circuit for motor 168 to stop print wheel 170 at its print point.

With continuing reference to FIGURE 6, print wheels 144, 158, and 172 are coaxially, rotatably mounted by unshown bearing assemblies on a horizontal shaft 176 which is fixed at opposite ends in upstanding parallel support brackets 178 and 180. Brackets 178 and 180 are fixed on a horizontal plate 182 below print wheels 144, 158, and 172. Below plate 182 and vertically below print wheels 144, 158, and 172 a print anvil 184 is mounted for limited vertical displacement through an aperture 186 formed in plate 182.

Print wheels 144, 158, and 172 have equal diameters and are each provided with raised digits on their peripheries to produce a printed record by actuating anvil 184. The bearings rotatably mounting print wheels 144, 158, and 172 on shaft 176 preferably are of the spring-load ball bearing type to releasably retain wheels 144, 158, and 172 in place with a ball and detent action until motors 140, 154, 168 are energized to drive the wheels in corresponding predetermined directions. This prevents print wheels 144, 158, and 172 from being inadvertently shifted from print positions to which they are driven.

Still referring to FIGURE 6, brackets 180 and 178 and plate 182 from a part of a rigid frame structure 187 which mounts motors 140, 154, and 168 and which is enclosed by a suitable casing 188 (see FIGURE 1). An ink reservoir 189 is mounted on frame structure 187 vertically about print wheels 144, 158, and 172 and is adapted to contain a supply of printing ink. A ribbon mechanism 190 comprising an endless ribbon 192 is shown to be trained under a roller 194 disposed in reservoir 189 below the level of ink therein. Ribbon 192 extends upwardly from roller 194 and is trained over a drive roller 196. From roller 196 ribbon 192 extends vertically downwardly and passes under a roller 198 disposed to the left and below print wheels 144, 158 and 172. From roller 198, ribbon 192 extends horizontally over aperture 186 below print wheel 144, 158, and 172 and passes around a further roller 200. From roller 200, ribbon 192 extends vertically upwardly, passes over a pair of rollers 202 and 204 and then downwardly into reservoir 189 where it again passes under roller 194. The rotational axes of rollers 194, 196, 198, 200, 202, and 204 are parallel and horizontal.

To drive ribbon 192, a motor 208 having a drive shaft 210 is mounted on frame structure 187. Fixed on shaft 210 is a sprocket wheel 212 about which an endless drive chain 214 is trained. Chain 214 is trained around a larger sprocket wheel 216 and sprocket wheel 216 is fixed on a shaft 220 which mounts roller 196. By energizing motor 208, ribbon 192 moves through the ink in reservoir 189 and under print wheels 144, 158, and 172. To print out a multi-digit number entered in printer 40 a label, card or other surface is manually fed through a slot 224 (see FIGURE 1) formed in casing 188 between ribbon 192 and anvil 184. Anvil 184 is displaced upwardly by energizing a print solenoid RP with sufficient impact to print out the digits on print wheels 144, 158, and 172 which are facing ribbon 192.

As shown in FIGURE 5, motor 208 is connected in parallel with motor 140 so that both of these motors are concomitantly energized and deenergized.

When a printed read-out of the weight of a load placed on platform 22 is desired with the system of this invention, pushbutton 104 is momentarily depressed after scale 20 comes into balance to energize motor 94 and relay DR0 and to momentarily open switch 122. By opening switch 122, the storage unit relay holding circuits are interrupted to thereby reset all of the relays in banks 114–116 if they were not reset previously by opening switch 124. As a result, storage unit 112 is cleared to accept a new digital read-out from switch assembly 70. By energizing relay DR0, contacts DR0-1 open to interrupt the energizing circuits for motors 140, 154, and 168, thus preventing movement of print wheels 144, 158, and 172 and of wiper arms 130, 131, and 132. Energization of relay DR0 also closes contacts DR0-2 to establish a holding circuit for relay DR0 and motor 94 through switch 106 with the result that relay DR0 and motor 94 remain energized after pushbutton 104 is released to its open position.

Energization of motor 94 rotates cam 90 to advance fingers 48–50 into engagement with cam wheel assembly 44, thereby advancing wiper arms 66–68 to digital positions in contact banks 72–74 corresponding the dial reading of scale 20. As an example, let it be assumed that the weight of the load placed on platform 22 is 109 pounds. Under these loading conditions, advancement of finger 50 moves wiper arm 68 into engagement with the second contact in bank 74 which is connected to relay R100, advancement of finger 49 moves wiper arm 67 into engagement with the first contact in bank 73 which is connected to relay R00, and advancement finger 48 moves wiper arm 66 into engagement with the last contact in bank 72 which is connected to relay R9.

With wiper arms 66–68 in position to be interrogated, switch 120 is momentarily closed by a cam 230 which is mounted on shaft 92 of motor 94. The contour of cam 230 is correlated with the contour on cam 90 so that switch 120 is momentarily closed after fingers 48–50 are advanced into their engaging, read-out positions with cam wheel assembly 44, but before fingers 48–50 are retracted by the continued rotation of cam 90.

As a result of momentarily closing switch 120 with a load weighing 109 pounds on platform 22, energizing circuits for relays R9, R00, and R100 in banks 114–116 are completed. Energization of relays R9, R00, and R100 respectively close contacts R9–1, R00–1, and R100–1 to complete holding circuits through switch 122 which at this stage of the operation is closed as a result of releasing pushbutton 104. Continued rotation of cam 230 opens switch 120, but at this stage, relays R9, R00, and R100 remain energized through their respective holding circuits which were established as a result of closing contacts R9–1, R00–1, and R100–1. As a result, the digital read-out entered into relay banks 114–116 by switch assembly 70 is retained in storage unit 112. Continued rotation of cam 90 to complete the read-out cycle by retracting fingers 48–50 to their retracted positions shown in the drawings, therefore, does not erase the digital information stored in unit 112. By energizing relays R9, R00, and R100, contacts R9–2, R00–2, and R100–2 are also closed to set up energizing circuits for relays RU, RT, and RH when wiper arms 130–132 are advanced to their proper positions in banks 134–136.

When the scale read-out cycle involving advancement and retraction of fingers 48–50 and the storage of the digital information in unit 112 is completed, cam 108 opens switch 106 to deenergize relay DR0 and motor 94. By deenergizing relay DR0, contacts DR0–1 close to complete energizing circuits for motors 140, 154, 168 and 208. Operation of motors 144, 154, and 168 advance wiper arms 130–132 to respectively scan banks 134–136 for the contacts which are connected to relay contacts R9–2, R00–2, and R100–2. Simultaneously, print wheels 144, 158, and 172 are rotated with the advancement of wiper arms 130–132. When wiper arms 130–132 are respectively advanced into engagement with the contacts in banks 134–136 that are connected to relay contacts R9–2, R00–2, and R100–2, parallel circuits are completed for energizing relays RU, RT, and RH.

By energizing relays RU, RT, and RH, contacts RU–1, RT–1, and RH–1 are respectively opened to interrupt the energizing circuits for motors 140, 154, 168, and 208, thus stopping print wheels 144, 158, and 172 at print points which coincide with the digital positions of wiper arms 130–132. Accordingly, the respective digits "1," "0," and "9" on print wheels 172, 158, and 144 will be positioned to face anvil 184 for printing out the multi-digit number when solenoid RP is pulsed to strike a card or label inserted into a slot 224 in casing 188 of printer 40.

As shown in FIGURE 4, energization of relays RU, RT, and RH respectively close normally open contacts RU–2, RT–2, and RH–2 which are connected across conductors 98 and 100 in series with a spring-loaded, print pushbutton 234 and solenoid RP. Accordingly the energization of relays RU, RT, and RH condition a circuit to be completed for energizing solenoid RP by manually depressing pushbutton 234. Contacts RU–2, RT–2, and RH–2 thus provide an interlock to prevent a printed read-out until wiper arms 130–132 are advanced to their coincidence positions for respectively energizing relays RU, RT, and RH. A signal lamp 236 also connected in series with normally open contacts RU–2, RT–2, and RH–2 is illuminated by energizing relays RU, RT, and RH to signal the operator that the printer is now conditioned to print out the digital information retained in storage unit 112. The operator then depresses pushbutton 234 to obtain a printed read-out in the manner previously described. As many printings of a single weight as desired may be made on separate cards or labels by repeatedly depressing pushbutton 234.

If desired, the load on platform 22 can be removed or replaced with a new load immediately following the entry of the digital information into storage unit 112 and the opening of switch 120. Thus, the next load to be weighed may be moved into position on platform 22 and beam 24 may be moving into balance while the operator is printing out the weight of a preceding load on one or more cards or labels.

Since printer 40 is remotely controlled and is structurally independent of scale 20, it may be located remotely from the weighing station. If desired, therefore, printer 40 may be located at a separate station which is distant from the weighing station at which scale 20 is located. The separate station may be a wrapping or shipping station to which the load is transferred after it is weighed on scale 20 at the weighing station.

The present invention is particularly useful in weighing and recording the weight of paper rolls produced in a paper mill.

In addition to indexing printing wheels, a parallel signal from storage unit 112 may advantageously be transmitted to control a printing card punch (not shown) through suitable converter (not shown) to punch out the weight of the load on a punch card. The card punch may be an I.B.M. Model 026, and the converter may be an I.B.M. Model RPQ.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a weighing system having a scale including a displaceable load-supporting part, a circuit having a series of electrically actuatable, bi-stable devices arranged in parallel current paths to respectively represent a series of digits in each of a plurality of orders of a multi-digit number, means responsive to displacement of said load-supporting part by a load applied thereto for actuating a pre-selected one of said bi-stable devices in each order for representing and retaining the weight of said load, means including a plurality of movable elements for scanning the condition of said series of bi-stable devices in respective ones of said orders, a plurality of indexable type carriers each connected to one of said elements for coordinated movement therewith, type on said carriers for printing out selected digits in the order associated with the ones of said element to which the carriers are connected, motor means energizable to move each element and to simultaneously index the carrier connected thereto, and means responsive to the detection of an actuated bi-stable device in each order by scanning said devices in the various orders with said elements for deenergizing said motor means to cease indexing of said carriers at printing positions corresponding to the weight of said load.

2. In a weighing system having a scale including a load-supporting part, a series of electrically actuatable, bi-stable devices arranged in parallel circuit relation to respectively represent a series of digits in each of a plurality of orders of a multi-digit number, means responsive to the displacement of said load-supporting member by a load applied thereto to actuate a pre-selected one of said bi-stable devices in each order for representing and retaining the weight of said load, means including a plurality of movable elements for scanning the condition of said series of bi-stable devices in respective ones of said orders, a plurality of indexable type carriers drive connected to respective ones of said elements for coordinated movement therewith, type on said carriers for printing out selected digits in the order associated with the ones of said elements to which said carriers are connected, a plurality of electric motors drive connected to respective ones of said elements and being energizable to move their respective elements for scanning said bi-stable devices and to simultaneously index the carriers connected to respective ones of said elements, and means responsive to the detection of actuated bi-stable devices in said orders by movement of the scanning elements associated therewith for independently deenergizing said motors to thereby independently cease the indexing of said carriers at printing positions corresponding to the weight of said load.

3. The weighing system defined in claim 2 comprising means for enabling energization of said motors only after preselected ones of said bi-stable devices are actuated by displacement of said load-supporting part.

4. The weighing machine defined in claim 2 comprising a type ribbon, means including a further motor for advancing said ribbon in printing relation to said carriers, and means connecting said further motor to be concomitantly energized and deenergized with one of the motors that is drive connected to one of said carriers.

5. The weighing machine defined in claim 4 wherein said ribbon is endless.

References Cited

UNITED STATES PATENTS 3,045,229  7/1962  Allen.

RICHARD B. WILKINSON, *Primary Examiner.*

STEPHEN J. TOMSKY, *Examiner.*

GEORGE H. MILLER JR., *Assistant Examiner.*